(12) United States Patent
Haxhiu et al.

(10) Patent No.: US 12,476,470 B2
(45) Date of Patent: Nov. 18, 2025

(54) POWER DISTRIBUTION ASSEMBLY

(71) Applicant: ABB Schweiz AG, Baden (CH)

(72) Inventors: Arber Haxhiu, Helsinki (FI); Mikko Kajava, Helsinki (FI)

(73) Assignee: ABB Schweiz AG, Baden (CH)

( * ) Notice: Subject to any disclaimer, the term of this patent is extended or adjusted under 35 U.S.C. 154(b) by 34 days.

(21) Appl. No.: 18/543,810

(22) Filed: Dec. 18, 2023

(65) Prior Publication Data

US 2024/0204534 A1    Jun. 20, 2024

(30) Foreign Application Priority Data

Dec. 20, 2022    (EP) ..................................... 22214929

(51) Int. Cl.
*H02J 3/46*    (2006.01)
*H02P 5/74*    (2006.01)

(52) U.S. Cl.
CPC .    *H02J 3/46* (2013.01); *H02P 5/74* (2013.01)

(58) Field of Classification Search
CPC ..................................... H02J 3/46; H02P 5/74
USPC ........................................................... 307/18
See application file for complete search history.

(56) References Cited

U.S. PATENT DOCUMENTS

| | | | |
|---|---|---|---|
| 7,429,201 B2 | 9/2008 | Rzadki et al. | |
| 10,985,563 B2 * | 4/2021 | Kuznetsov | ............ H02J 7/1423 |
| 11,581,739 B2 * | 2/2023 | Gjerpe | ...................... H02J 4/00 |
| 11,764,583 B2 * | 9/2023 | Haugan | ................... H02M 3/42 |
| | | | 307/9.1 |
| 2002/0047309 A1 | 4/2002 | Droppo et al. | |
| 2004/0069251 A1 | 4/2004 | Rzadki | |
| 2013/0313894 A1 * | 11/2013 | Settemsdal | ........... B60R 16/033 |
| | | | 307/9.1 |
| 2020/0136423 A1 | 4/2020 | Haxhiu et al. | |
| 2021/0273554 A1 | 9/2021 | Liu et al. | |

(Continued)

FOREIGN PATENT DOCUMENTS

| | | |
|---|---|---|
| EP | 2482425 A1 | 8/2012 |
| EP | 3046206 A1 | 7/2016 |
| WO | 2018004765 A2 | 1/2018 |

(Continued)

OTHER PUBLICATIONS

European Search Report; Application No. 22214929.6; Issued: May 17, 2023; 4 Pages.

(Continued)

*Primary Examiner* — Hal Kaplan
(74) *Attorney, Agent, or Firm* — Whitmyer IP Group LLC

(57) ABSTRACT

A power distribution assembly having: a first DC power source and a second DC power source each including at least one fuel cell; a first DC bus bar electrically connected to the first DC power source, and a second DC bus bar electrically connected to the second DC power source and galvanically isolated from it; and a first supply converter electrically connected to the first DC bus bar, and a second supply converter electrically connected to the second DC bus bar. The power distribution assembly includes at least one multi-winding machine unit, which is an alternating current rotating machine unit including a first stator winding and a second stator winding, wherein the first stator winding is electrically connected to the first supply converter, and the second stator winding is electrically connected to the second supply converter.

19 Claims, 2 Drawing Sheets

(56) References Cited

U.S. PATENT DOCUMENTS

2021/0347459 A1  11/2021  Lipponen et al.

FOREIGN PATENT DOCUMENTS

WO  2018004765 A3  3/2018
WO  2021130158 A1  7/2021

OTHER PUBLICATIONS

Korean Office Action; Application No. 10-2023-0185608; Issued: May 12, 2025; 6 Pages.

\* cited by examiner

POWER DISTRIBUTION ASSEMBLY

TECHNICAL FIELD

The present invention relates to a power distribution assembly, and more particularly to a power distribution assembly comprising fuel cells.

BACKGROUND

One of the problems associated with a known power distribution assembly comprising fuel cells and having a high nominal power is low isolation resistance to ground. Due to the low isolation resistance, the power capacity of galvanically connected fuel cells is limited to about 1.5-2 MW. If larger installations are needed, galvanic isolation must be applied. However, the galvanic isolation is expensive and requires larger system components compared to galvanically non-isolating connections.

SUMMARY

An object of the present invention is to provide a power distribution assembly so as to solve the above problems. The objects of the invention are achieved by a power distribution assembly described in the following.

The invention is based on the idea of providing galvanic isolation between fuel cell groups of a power distribution assembly by electrically connecting the fuel cell groups to DC bus bars that are galvanically isolated from each other, and enabling power transfer between different DC bus bars through at least one multi-winding machine unit.

An advantage of the power distribution assembly of the invention is that no galvanically isolated DC/DC converters are required. In general, galvanically isolating DC/DC converters are larger, more expensive, and less efficient than galvanically non-isolating DC/DC converters.

Another advantage of the power distribution assembly of the invention is that common mode noise in the power system is reduced. By dividing one large DC bus bar into a plurality of smaller galvanically isolated DC bus bars, common mode noise in the power distribution assembly is significantly reduced. For example, if one large DC grid is split into two equal galvanically isolated DC grids, ground leakage capacitance of each of the resulting galvanically isolated DC grids is theoretically half of ground leakage capacitance of the original large DC grid. Thus, ground leakage currents would also be reduced.

BRIEF DESCRIPTION OF THE DRAWINGS

In the following the invention will be described in greater detail by means of preferred embodiments with reference to the attached drawings, in which.

DETAILED DESCRIPTION

Figure 1:
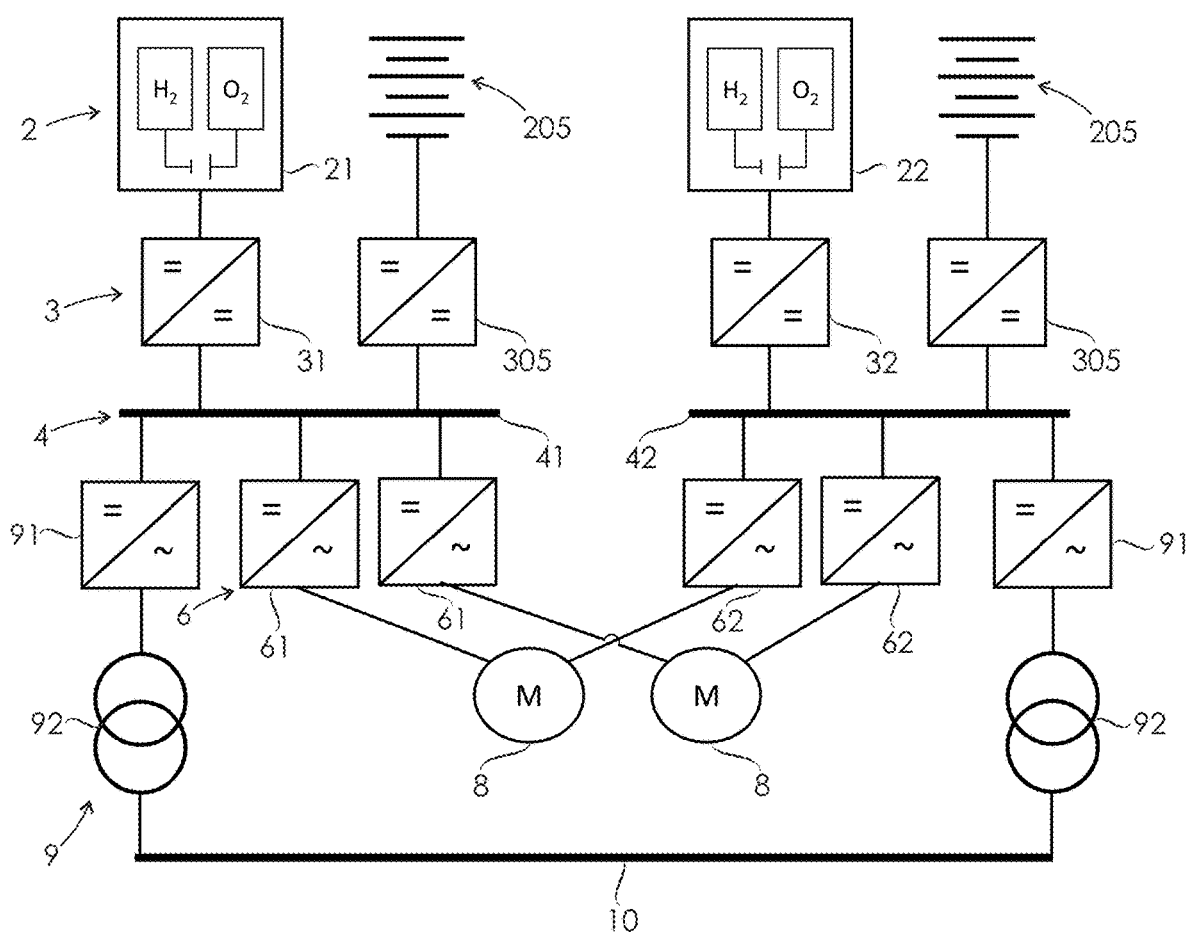
FIG. 1 shows a power distribution assembly according to an embodiment of the invention.

FIG. 1 shows a power distribution assembly comprising a DC power source system 2, a direct current converter system 3, a DC bus bar system 4, a supply converter system 6, two multi-winding machine units 8, a bus bar link system 9, and an AC bus bar 10.

The DC power source system 2 comprises a first DC power source 21 and a second DC power source 22. Each of the first DC power source 21 and the second DC power source 22 comprises at least one fuel cell. The at least one fuel cell of both the first DC power source 21 and the second DC power source 22 is provided with a direct stack cooling system in which coolant water is directly applied to fuel cell bipolar plates for efficient heat removal.

The DC bus bar system 4 comprises a first DC bus bar 41 electrically connected to the first DC power source 21, and a second DC bus bar 42 electrically connected to the second DC power source 22. The first DC bus bar 41 and the second DC bus bar 42 are permanently galvanically isolated from each other. Herein, permanent galvanic isolation between the first DC bus bar 41 and the second DC bus bar 42 means that the power distribution assembly does not comprise an electrical switch adapted to galvanically connect the first DC bus bar 41 and the second DC bus bar 42.

The direct current converter system 3 comprises a first DC to DC converter 31 and a second DC to DC converter 32. The first DC to DC converter 31 is electrically connected between the first DC power source 21 and the first DC bus bar 41, and the second DC to DC converter 32 is electrically connected between the second DC power source 22 and the second DC bus bar 42. In other words, the first DC power source 21 is electrically connected to the first DC bus bar 41 through the first DC to DC converter 31, and the second DC power source 22 is electrically connected to the second DC bus bar 42 through the second DC to DC converter 32.

The supply converter system 6 comprises two first supply converters 61 each electrically connected to the first DC bus bar 41, and two second supply converters 62 each electrically connected to the second DC bus bar 42. Each of the first supply converters 61 and each of the second supply converters 62 is a bidirectional DC to AC converter.

Each of the two multi-winding machine units 8 is an alternating current rotating machine unit comprising a machine shaft, a rotor winding system stationarily connected relative to the machine shaft, and a stator winding system comprising a first stator winding and a second stator winding. The stator winding system is adapted to interact magnetically with the rotor winding system. When a multi-winding machine unit 8 operates as an electric motor, the stator winding system interacts magnetically with the rotor winding system in order to rotate the machine shaft relative to the stator winding system. Number of the multi-winding machine units is not limited to two but a power distribution assembly according to the present invention comprises at least one multi-winding machine unit.

There is one first supply converter 61 and one second supply converter 62 for each multi-winding machine unit 8. One first supply converter 61 is adapted to supply power to the first stator winding of one multi-winding machine unit 8, and the other first supply converter 61 is adapted to supply power to the first stator winding of the other multi-winding machine unit 8. Similarly, one second supply converter 62 is adapted to supply power to the second stator winding of the one multi-winding machine unit 8, and the other second supply converter 62 is adapted to supply power to the second stator winding of the other multi-winding machine unit 8.

In an embodiment, a multi-winding machine unit comprises a multi-winding machine such that the machine shaft is a monolithic shaft, and the first stator winding and the second stator winding at least partially overlap in a direction parallel to a rotation axis of the machine shaft.

In an alternative embodiment, a multi-winding machine unit comprises a first electric machine and a second electric machine such that the machine shaft comprises shafts of the first electric machine and the second electric machine mechanically connected together, wherein the first stator winding is a stator winding of the first electric machine, and the second stator winding is a stator winding of the second electric machine.

The power distribution assembly has a special operating state in which the supply converter system 6 is adapted to supply power between the first DC bus bar 41 and the second DC bus bar 42 through the multi-winding machine units 8. It should be noted that such a power transmission does not form a galvanic connection between the first DC bus bar 41 and the second DC bus bar 42.

The bus bar link system 9 electrically connects the first DC bus bar 41 and the second DC bus bar 42 to the AC bus bar 10. The bus bar link system 9 comprises a link converter 91 and a link transformer 92 for each of the first DC bus bar 41 and the second DC bus bar 42. The link converter 91 is a DC to AC converter. The first DC bus bar 41 is electrically connected to the AC bus bar 10 through one link converter 91 and one link transformer 92, and the second DC bus bar 42 is electrically connected to the AC bus bar 10 through another link converter 91 and another link transformer 92.

Each of the link converters 91 is a bidirectional converter adapted to enable power transfer between the first DC bus bar 41 and the second DC bus bar 42. The AC bus bar 10 is adapted to be electrically connected to a load (not shown) of the power distribution assembly other than the multi-winding machine units 8.

In an alternative embodiment, the power distribution assembly comprises neither the bus bar link system nor the AC bus bar. In such an embodiment, the only way to transfer power between different DC bus bars is through the at least one multi-winding machine unit.

Figure 2:
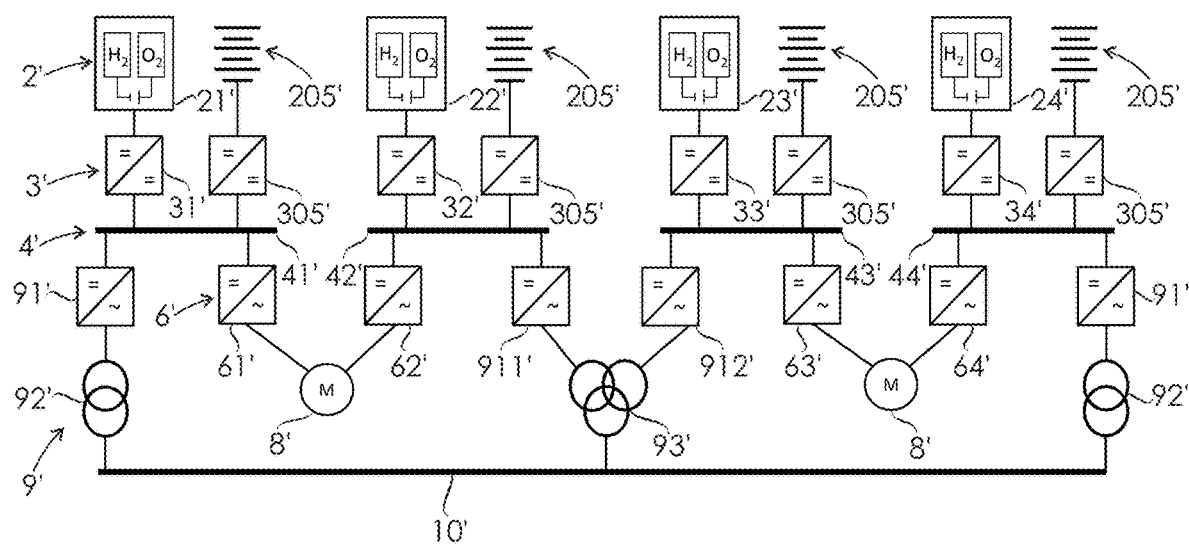
FIG. 2 shows a power distribution assembly according to another embodiment of the invention.

FIG. 2 shows a power distribution assembly comprising a DC power source system 2', a direct current converter system 3', a DC bus bar system 4', a supply converter system 6', two multi-winding machine units 8', a bus bar link system 9', and an AC bus bar 10'.

The DC power source system 2' comprises a first DC power source 21', a second DC power source 22', a third DC power source 23' and a fourth DC power source 24'. Each of the DC power sources 21' to 24' comprises at least one fuel cell. The at least one fuel cell of each of the DC power sources 21' to 24' is provided with the direct stack cooling system.

The DC bus bar system 4' comprises a first DC bus bar 41' electrically connected to the first DC power source 21', a second DC bus bar 42' electrically connected to the second DC power source 22', a third DC bus bar 43' electrically connected to the third DC power source 23', and a fourth DC bus bar 44' electrically connected to the fourth DC power source 24'. The DC bus bars 41' to 44' are permanently galvanically isolated from each other.

The direct current converter system 3' comprises a first DC to DC converter 31', a second DC to DC converter 32', a third DC to DC converter 33', and a fourth DC to DC converter 34'. The first DC to DC converter 31' is electrically connected between the first DC power source 21' and the first DC bus bar 41', the second DC to DC converter 32' is electrically connected between the second DC power source 22' and the second DC bus bar 42', the third DC to DC converter 33' is electrically connected between the third DC power source 23' and the third DC bus bar 43', and the fourth DC to DC converter 34' is electrically connected between the fourth DC power source 24' and the fourth DC bus bar 44'.

The supply converter system 6' comprises a first supply converter 61' electrically connected to the first DC bus bar 41', a second supply converter 62' electrically connected to the second DC bus bar 42', a third supply converter 63' electrically connected to the third DC bus bar 43', and a fourth supply converter 64' electrically connected to the fourth DC bus bar 44'. Each of the supply converters 61' to 64' is a bidirectional DC to AC converter.

The two multi-winding machine units 8' are identical to the two multi-winding machine units 8 shown in FIG. 1. There are two supply converters for each multi-winding machine unit 8'. The first supply converter 61' is adapted to supply power to the first stator winding of one multi-winding machine unit 8', and the second supply converter 62' is adapted to supply power to the second stator winding of said one multi-winding machine unit 8'. The third supply converter 63' is adapted to supply power to the first stator winding of another multi-winding machine unit 8', and the fourth supply converter 64' is adapted to supply power to the second stator winding of said another multi-winding machine unit 8'.

The bus bar link system 9' electrically connects the first DC bus bar 41', the second DC bus bar 42', the third DC bus bar 43' and the fourth DC bus bar 44' to the AC bus bar 10'. The bus bar link system 9' comprises a link converter 91' and a link transformer 92' for each of the first DC bus bar 41' and the fourth DC bus bar 44'. The first DC bus bar 41' is electrically connected to the AC bus bar 10' through one link converter 91' and one link transformer 92', and the fourth DC bus bar 44' is electrically connected to the AC bus bar 10' through another link converter 91' and another link transformer 92'.

Each of the link converters 91' is a bidirectional converter. The AC bus bar 10' is adapted to be electrically connected to a load (not shown) of the power distribution assembly other than the multi-winding machine units 8'.

Further, the bus bar link system 9' comprises a first transfer converter 911', a second transfer converter 912', and a three winding transformer 93'. The first transfer converter 911' is electrically connected between the second DC bus bar 42' and a primary winding of the three winding transformer 93', the second transfer converter 912' is electrically connected between the third DC bus bar 43' and a secondary winding of the three winding transformer 93', and a tertiary winding of the three winding transformer 93' is electrically connected to the AC bus bar 10'.

Each of the first transfer converter 911' and the second transfer converter 912' is a bidirectional converter. The three winding transformer 93' is adapted for transferring power between the second DC bus bar 42', the third DC bus bar 43' and the AC bus bar 10'.

In both the power distribution assembly of FIG. 1 and the power distribution assembly of FIG. 2, the DC power source system comprises a plurality of fuel cells such that each of the plurality of DC bus bars is electrically connected to at least one of the plurality of fuel cells. Total nominal power of the plurality of fuel cells is greater than 2 MW while nominal power of the at least one fuel cell connected to any individual one of the plurality of DC bus bars is less than or equal to 2 MW.

In an embodiment, total nominal power of the plurality of fuel cells of the DC power source system is greater than or equal to 3 MW.

It should be noted that different types of DC power sources affect differently ground leakage capacitance of the power distribution assembly. In general, fuel cells are much more significant than other types of DC power sources like for example batteries or DC generators.

The power distribution assembly of FIG. 1 comprises a battery 205 and a battery converter 305 for each of the DC bus bars 41 and 42. Each battery 205 is electrically connected to corresponding DC bus bar through a battery converter 305.

The power distribution assembly of FIG. 2 comprises a battery 205' and a battery converter 305' for each of the DC bus bars 41' to 44'. Each battery 205' is electrically connected to corresponding DC bus bar through a battery converter 305'.

Referring to the power distribution assemblies of FIGS. 1 and 2, the division of the DC bus bar systems 4 and 4' into a plurality of galvanically isolated DC bus bars is mainly necessitated by the fuel cells. Accordingly, above is discussed only limitations relating to power of fuel cells connected to any individual one of the plurality of DC bus bars.

In some embodiments, a power distribution assembly according to present invention comprises a fuse system and/or an AC circuit breaker system.

The fuse system is located electrically between the DC bus bar system and the supply converter system, and is adapted to prevent a fault from expanding from one DC bus bar to another via the multi-winding machine unit. Referring to the power distribution assembly shown in FIG. 1, the fuse system could comprise a first fuse located electrically between the first DC bus bar 41 and the first supply converter 61, and a second fuse located electrically between the second DC bus bar 42 and the second supply converter 62.

The AC circuit breaker system is adapted to electrically disconnect the DC bus bar system from the at least one multi-winding machine unit. Referring to the power distribution assembly shown in FIG. 1, the AC circuit breaker system could comprise a first AC circuit breaker electrically located between the first supply converter 61 and the first stator winding, and a second AC circuit breaker electrically located between the second supply converter 62 and the second stator winding.

In an embodiment, the at least one multi-winding machine unit comprises a propulsion motor of a vessel. In said embodiment, the power distribution assembly is installed on board the vessel.

It will be obvious to a person skilled in the art that the inventive concept can be implemented in various ways. The invention and its embodiments are not limited to the examples described above but may vary within the scope of the claims.

The invention claimed is:

1. A power distribution assembly comprising:
a DC power source system comprising a plurality of DC power sources, wherein the plurality of DC power sources includes a first DC power source and a second DC power source, wherein each of the first DC power source and the second DC power source includes at least one fuel cell;
a DC bus bar system comprising a plurality of DC bus bars, wherein the plurality of DC bus bars includes a first DC bus bar electrically connected to the first DC power source, and a second DC bus bar electrically connected to the second DC power source, wherein the first DC bus bar and the second DC bus bar are galvanically isolated from each other; and
a supply converter system comprising a plurality of supply converters, wherein each of the plurality of supply converters is a DC to AC converter, and wherein the plurality of supply converters includes a first supply converter electrically connected to the first DC bus bar, and a second supply converter electrically connected to the second DC bus bar,
wherein the power distribution assembly comprises at least one multi-winding machine unit having a machine shaft, a stator winding system and a rotor winding system such that the stator winding system includes a first stator winding and a second stator winding, the rotor winding system is stationarily connected relative to the machine shaft, and the stator winding system is adapted to interact magnetically with the rotor winding system,
wherein the first stator winding is electrically connected to the first supply converter, and the second stator winding is electrically connected to the second supply converter, and
wherein the power distribution assembly has a special operating state in which the supply converter system is adapted to supply power between the first DC bus bar and the second DC bus bar through the at least one multi-winding machine unit.

2. The power distribution assembly according to claim 1, wherein the power distribution assembly comprises a direct current converter system including a first DC to DC converter and a second DC to DC converter, wherein the first DC to DC converter is electrically connected between the first DC power source and the first DC bus bar, and the second DC to DC converter is electrically connected between the second DC power source and the second DC bus bar, and both the first DC to DC converter and the second DC to DC converter are galvanically non-isolating DC to DC converters.

3. The power distribution assembly according to claim 1, wherein the first DC bus bar and the second DC bus bar are permanently electrically isolated from each other.

4. The power distribution assembly according to claim 1, wherein the at least one fuel cell of both the first DC power source and the second DC power source is provided with a direct stack cooling system in which coolant water is directly applied to fuel cell bipolar plates for efficient heat removal.

5. The power distribution assembly according to claim 1, wherein the DC power source system comprises a plurality of fuel cells such that each of the plurality of DC bus bars is electrically connected to at least one of the plurality of fuel cells, wherein total nominal power of the plurality of fuel cells is greater than 2 MW while nominal power of the at least one fuel cell connected to any individual one of the plurality of DC bus bars is less than or equal to 2 MW.

6. The power distribution assembly according to claim 5, wherein the total nominal power of the plurality of fuel cells is greater than or equal to 3 MW.

7. The power distribution assembly according to claim 1, wherein the at least one multi-winding machine unit comprises a multi-winding machine such that the machine shaft is a monolithic shaft, and the first stator winding and the second stator winding at least partially overlap in a direction parallel to a rotation axis of the machine shaft.

8. The power distribution assembly according to claim 1, wherein the at least one multi-winding machine unit comprises a first electric machine and a second electric machine such that the machine shaft includes shafts of the first electric machine and the second electric machine mechanically connected together, wherein the first stator winding is a stator winding of the first electric machine, and the second stator winding is a stator winding of the second electric machine.

9. The power distribution assembly according to claim 1, wherein the power distribution assembly comprises:
an AC bus bar; and
a bus bar link system electrically connecting at least two of the plurality of DC bus bars to the AC bus bar.

10. The power distribution assembly according to claim 9, wherein the bus bar link system comprises a link converter for each of said at least two of the plurality of DC bus bars, wherein the link converter is a DC to AC converter.

11. The power distribution assembly according to claim 10, wherein the bus bar link system comprises a link transformer for each of said at least two of the plurality of DC bus bars, the link transformer being connected in series with a corresponding link converter.

12. The power distribution assembly according to claim 9, wherein the bus bar link system comprises a first transfer converter, a second transfer converter, and a three winding transformer, wherein the first transfer converter is electrically connected between one of the plurality of DC bus bars and a primary winding of the three winding transformer, the second transfer converter is electrically connected between another of the plurality of DC bus bars and a secondary winding of the three winding transformer, and a tertiary winding of the three winding transformer is electrically connected to the AC bus bar.

13. A power distribution assembly comprising:
a DC power source system comprising a plurality of DC power sources, wherein the plurality of DC power sources includes a first DC power source and a second DC power source, wherein each of the first DC power source and the second DC power source includes at least one fuel cell;
a DC bus bar system comprising a plurality of DC bus bars, wherein the plurality of DC bus bars includes a first DC bus bar electrically connected to the first DC power source, and a second DC bus bar electrically connected to the second DC power source, wherein the first DC bus bar and the second DC bus bar are galvanically isolated from each other; and
a supply converter system comprising a plurality of supply converters, wherein each of the plurality of supply converters is a DC to AC converter, and wherein the plurality of supply converters includes a first supply converter electrically connected to the first DC bus bar, and a second supply converter electrically connected to the second DC bus bar,
wherein the power distribution assembly comprises at least one multi-winding machine unit having a machine shaft, a stator winding system and a rotor winding system such that the stator winding system includes a first stator winding and a second stator winding, the rotor winding system is stationarily connected relative to the machine shaft, and the stator winding system is adapted to interact magnetically with the rotor winding system,
wherein the first stator winding is electrically connected to the first supply converter, and the second stator winding is electrically connected to the second supply converter,
wherein the power distribution assembly comprises a direct current converter system including a first DC to DC converter and a second DC to DC converter, wherein the first DC to DC converter is electrically connected between the first DC power source and the first DC bus bar, and the second DC to DC converter is electrically connected between the second DC power source and the second DC bus bar, and both the first DC to DC converter and the second DC to DC converter are galvanically non-isolating DC to DC converters.

14. The power distribution assembly according to claim 13, wherein the first DC bus bar and the second DC bus bar are permanently electrically isolated from each other.

15. The power distribution assembly according to claim 13, wherein the at least one fuel cell of both the first DC power source and the second DC power source is provided with a direct stack cooling system in which coolant water is directly applied to fuel cell bipolar plates for efficient heat removal.

16. A power distribution assembly comprising:
a DC power source system comprising a plurality of DC power sources, wherein the plurality of DC power sources includes a first DC power source and a second DC power source, wherein each of the first DC power source and the second DC power source includes at least one fuel cell;
a DC bus bar system comprising a plurality of DC bus bars, wherein the plurality of DC bus bars includes a first DC bus bar electrically connected to the first DC power source, and a second DC bus bar electrically connected to the second DC power source, wherein the first DC bus bar and the second DC bus bar are galvanically isolated from each other; and
a supply converter system comprising a plurality of supply converters, wherein each of the plurality of supply converters is a DC to AC converter, and wherein the plurality of supply converters includes a first supply converter electrically connected to the first DC bus bar, and a second supply converter electrically connected to the second DC bus bar,
wherein the power distribution assembly comprises at least one multi-winding machine unit having a machine shaft, a stator winding system and a rotor winding system such that the stator winding system includes a first stator winding and a second stator winding, the rotor winding system is stationarily connected relative to the machine shaft, and the stator winding system is adapted to interact magnetically with the rotor winding system,
wherein the first stator winding is electrically connected to the first supply converter, and the second stator winding is electrically connected to the second supply converter,
wherein the DC power source system comprises a plurality of fuel cells such that each of the plurality of DC bus bars is electrically connected to at least one of the plurality of fuel cells, wherein total nominal power of the plurality of fuel cells is greater than 2 MW while nominal power of the at least one fuel cell connected to any individual one of the plurality of DC bus bars is less than or equal to 2 MW.

17. The power distribution assembly according to claim 16, wherein the total nominal power of the plurality of fuel cells is greater than or equal to 3 MW.

18. The power distribution assembly according to claim 16, wherein the first DC bus bar and the second DC bus bar are permanently electrically isolated from each other.

19. The power distribution assembly according to claim 16, wherein the at least one fuel cell of both the first DC power source and the second DC power source is provided with a direct stack cooling system in which coolant water is directly applied to fuel cell bipolar plates for efficient heat removal.

\* \* \* \* \*